US006882839B2

(12) United States Patent
Jacobson et al.

(10) Patent No.: US 6,882,839 B2
(45) Date of Patent: Apr. 19, 2005

(54) ONE-WAY ROAMING FROM ANS-41 TO GSM SYSTEMS

(75) Inventors: Terry Jacobson, Deerfield, IL (US); Douglas Harold Rollender, Bridgewater, NJ (US); Michael Marcovici, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 585 days.

(21) Appl. No.: 09/851,101

(22) Filed: May 8, 2001

(65) Prior Publication Data

US 2002/0168960 A1 Nov. 14, 2002

(51) Int. Cl.[7] .............................. H04Q 7/20; H04Q 7/38
(52) U.S. Cl. ....................... 455/432; 455/432; 455/411; 455/461; 455/422; 455/433; 380/25; 380/30; 380/218; 380/23; 379/62
(58) Field of Search ................................. 455/432, 411, 455/461, 42, 433, 410, 445, 426, 561; 380/23, 25, 30, 218, 49; 370/441

(56) References Cited

U.S. PATENT DOCUMENTS

| | | | |
|---|---|---|---|
| 5,537,474 A | * | 7/1996 | Brown et al. ................ 380/248 |
| 5,668,875 A | * | 9/1997 | Brown et al. ................ 380/248 |
| 5,862,481 A | | 1/1999 | Iskra et al. |
| 5,878,036 A | * | 3/1999 | Spartz et al. ................ 370/335 |
| 6,038,440 A | * | 3/2000 | Wu ............................. 455/410 |
| 6,178,337 B1 | * | 1/2001 | Spartz et al. ................ 455/561 |
| 6,526,033 B1 | * | 2/2003 | Wang et al. ................. 370/338 |

FOREIGN PATENT DOCUMENTS

EP 0 955 783 11/1999 ............ H04Q/7/38

WO 00/79827 A 12/2000 ............ H04Q/7/38

OTHER PUBLICATIONS

Uchiyama, Y. et al: "Network functions and signaling for personal roaming between digital cellular standars", 1995 Fourth IEEE International Conference on Universal Personal Communications Record. Gateway to the 21st Century. Tokyo, Nov. 6–10, 1995, IEEE International Conference on Universal Personal Communications, New York, IEEE, US, vol. Conf. 4, Nov. 6, 1995, pp. 447–451, XP010160579, ISBN: 0-7803-2955-4, the whole document.

European Search Report dated Sep. 19, 2002.

* cited by examiner

Primary Examiner—David Hudspeth
Assistant Examiner—Julio Perez

(57) ABSTRACT

Disclosed is a method and apparatus for providing authentication for a subscriber of a wireless communication system employing one type of authentication technology roaming into a wireless communication system employing a second type of authentication technology. The method and apparatus involves transmitting (or receiving) a first message to a first system comprising a mobile identifier for a subscriber of the first and a second system indicator indicating that the subscriber is attempting to gain access to a second system that uses an authentication process different than an authentication process used by the first system; determining shared secret data for the subscriber using the mobile identifier; receiving (or transmitting) a second message from the first system having shared secret data associated with the subscriber; generating an expected response to a unique challenge using the shared secret data and an encryption algorithm, and transmitting the expected response to the second system.

6 Claims, 4 Drawing Sheets

40

ONE-WAY ROAMING FROM ANS-41 TO GSM SYSTEMS

FIELD OF THE INVENTION

The present invention relates generally to wireless communication systems and, in particular, to roaming among wireless communication systems.

BACKGROUND OF THE RELATED ART

Subscribers to wireless communication systems employing the well-known ANS-41 signaling protocol standard may, at times, roam outside their home system and into wireless communication systems employing the well known GSM standard. Assuming that the subscribers have user equipment or mobile-stations operable to function in either wireless communication system, some form of authentication needs to be performed before the GSM based wireless communications system can provide any type of service to the subscribers of the ANS-41 based wireless communication systems. However, the manner in which authentication is performed in GSM and ANS-41 based wireless communication systems are different. Accordingly, there exists a need for providing authentication for a subscriber to a ANS-41 based wireless communication system roaming into a GSM based wireless communication system, and vice-versa.

SUMMARY OF THE INVENTION

The present invention is a method and apparatus for providing authentication for a subscriber of a wireless communication system employing one type of authentication technology roaming into a wireless communication system employing a second type of authentication technology. The present invention involves transmitting (or receiving) a first message to a first system comprising a mobile identifier for a subscriber of the first and a second system indicator indicating that the subscriber is attempting to gain access to a second system that uses an authentication process different than an authentication process used by the first system; determining shared secret data for the subscriber using the mobile identifier; receiving (or transmitting) a second message from the first system having shared secret data associated with the subscriber; generating an expected response to a unique challenge using the shared secret data and an encryption algorithm, and transmitting the expected response to the second system.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention uses an Interoperability/Interworking Function (IIF) as a logical network entity between the edges of two wireless communication systems based on different technologies to map or convert operations, messages and/or procedures from one signaling protocol to another (e.g., ANS-41 to GSM). For purposes of discussion, the present invention will be described herein with reference to a subscriber of an ANS-41 based wireless communication system (ANS-41) roaming or visiting in a GSM based wireless communication (GSM system). It should be understood that the present invention can also be applied for a subscriber of a GSM based wireless communication system roaming or visiting in an ANS-41 based wireless communication system.

Figure 1:
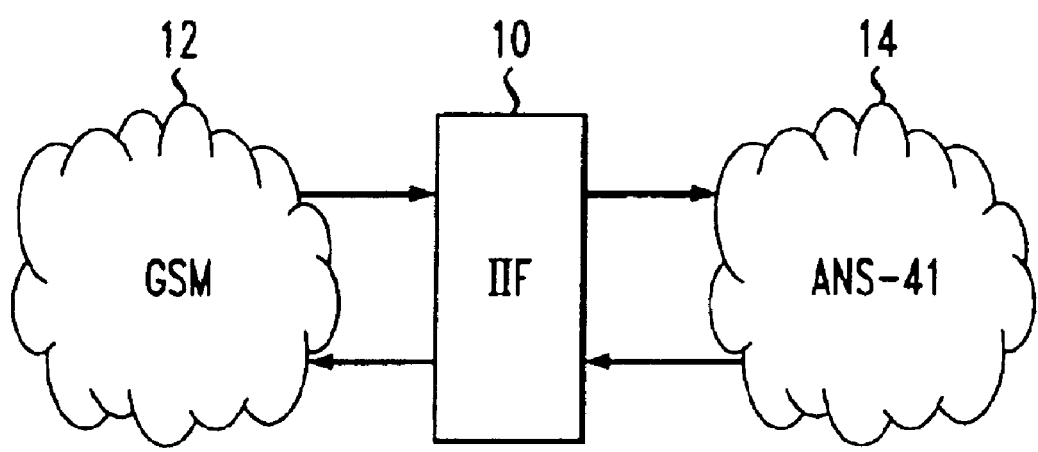
FIG. 1 depicts an example of an IIF of the present invention positioned between the edges of a GSM system and an ANS-41 system.
Figure 1:
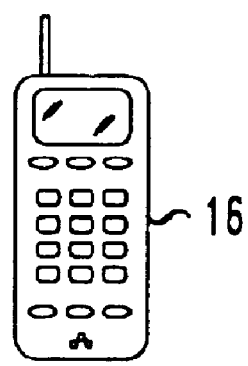

FIG. 1 depicts an example of an IIF 10 of the present invention positioned between the edges of a GSM system 12 and an ANS-41 system 14, wherein ANS-41 system 14 includes enhanced authentication and mobility management capabilities to support roaming of its subscribers to GSM system 12, as will be described herein.

A subscriber of ANS-41 system 14 is equipped with user equipment 16. User equipment 16 is either an ANS-41 based user equipment capable of roaming into GSM system 12 or a GSM based user equipment having a User Identity Module (UIM) of the subscriber. Regardless of the type of user equipment 16, a Mobile-station Identification Number (MIN) based on an International Mobile-station Subscriber Identification (IMSI) is programmed in user equipment 16 for use in GSM system 12. User equipment 16 (or the UIM inserted therein) is capable of generating Shared Secret Data (SSD) for the subscriber, and to use the SSD and the well-known CAVE algorithm (or some other encryption algorithm) to generate a response (RES) to random challenges (RAND) issued by GSM system 12 and to generate a cipher key $K_c$.

Preferably, IIF 10 requires no or little changes to standard network protocol in its interactions with either systems 12 or 14. IIF 10 functions as a Visitor Location Register (VLR) in its interactions with ANS-41 system 14 to support roaming of the subscriber in GSM system 12. IIF 10 functions as a GSM Home Location Register (HLR) and Authentication Center (AC) in its interactions with GSM system 12. IIF 10 supports the enhanced operations required for authentication of user equipment 16 in GSM system 12. IIF 10 provides GSM triplets needed for authentication and privacy in GSM system 12 using the CAVE algorithm and the SSD provided by an HLR of the wireless communication system to which user equipment 16 belongs, wherein the GSM triplets include the RAND, $K_c$ and an expected response (XRES). IIF 10 is operable to convert an IMSI into a MIN to be used by ANS-41 system 14, and a MIN into an IMSI to be used by GSM system 12.

ANS-41 system 14 shares SSD with IIF 10 for roaming subscribers of ANS-41 system 14 into GSM system 12. Note that the AC should not be able to update SSD or a COUNT value for the subscriber when the subscriber is being served by GSM system 12. The subscriber's SSD is updated when the user returns to ANS-41 system 12 or leaves GSM system 14. IIF 10 is capable of providing a secure method of storing SSD received from ANS-41 system 14. IIF 10 does not transmit or otherwise disclose the SSD to any other network entity.

For illustration purposes, the following example of a subscriber of ANS-41 system 14 roaming or visiting GSM system 12 is provided. User equipment 16 presents itself to GSM system 12 for service. GSM system 12 records the presence of user equipment 16 in its VLR and will attempt to authenticate user equipment 16 via the HLR of ANS-41 system 14. Since the VLR of GSM system 12 and the HLR of ANS-41 system are of different technologies, IIF 10 is needed to assist in the authentication process, including translating messages between the two systems 12 and 14.

In IIF 10's interactions with GSM system 12, IIF 10 appears to GSM system 12 as a HLR of the same technology as GSM system 12. By contrast, in IIF 10's interactions with ANS-41 system 14, IIF 10 appears to ANS-41 system 14 as a VLR of the same technology as ANS-41 system 14. When IIF 10 receives a message from GSM system 12 for authentication of user equipment 16, IIF converts the message to a format based on ANS-41. The converted message is then transmitted to ANS-41 system 14.

Preferably, IIF does not need to be provisioned with any subscriber specific data, such as Mobile-Station Identification (MSID) in the form of a MIN or IMSI. Subscriber specific data can also include an Electronic Serial Number (ESN) of the subscriber associated with the MIN. A common identifier is preferably used by GSM system 12 and ANS-41 system 14 for user equipment 16. For example, the IMSI is used in both systems 12 and 14 to identify user equipment 16. However, when different identifiers are used by both systems 12 and 14 to identify a subscriber, IIF 10 needs to convert identifiers used in one system to identifiers used in the other system. In this situation, either a database for converting identifiers (e.g., from IMSI to MIN, and vice-versa) would be required or a change to the receiving system may be required. For example, the ESN is required to authenticate a subscriber of ANS-41 system 14 but not in GSM system 12. When user equipment 16 of the subscriber presents itself to GSM system 12, GSM system 12 does not require the ESN of user equipment 16. Thus, GSM system 12 does not present to IIF 10 the ESN since it thinks its interacting with a GSM based VLR. When IIF 10 attempts to use the information provided to it by GSM system 12 to authenticate user equipment 16 with ANS-41 system 14, IIF 10 does not have an ESN to provide the HLR of ANS-41 system 14 as required in an ANS-41 authentication request operation (AUTHREQ). To compensate for this lack of ESN and appear to ANS-41 system 14 as a ANS-41 based VLR, the present invention requires IIF 10 to present a default or mull value in place of an ESN in the AUTHREQ. In response to the AUTHREQ, the HLR of ANS-41 system 14 responds with the subscriber's real ESN. IIF 10 stores the subscriber's real ESN in its temporary memory to present to ANS-41 system 14 in future operations where it is required. The subscriber's real ESN is preferably not saved by IIF 10 after the subscriber leaves GSM system 12.

The above described exchange of ESN (between IIF 10 and ANS-41 system 14) is not normally acceptable to the HLR of ANS-41 system 14. In the present invention, an exception for exchanging the ESN is allowed at the HLR of ANS-41 system 14. That is, for subscribers of ANS-41 system 14 roaming into GSM system 12, the HLR of ANS-41 system 14 will permit an exchange of ESN with IIF 10. IIF 10 will provide an indication to ANS-41 system 14 that the subscriber is roaming in GSM system 12. For example, the indication is a unique value in a system capability (SYSCAP) parameter. A GSM system access type may also be indicated through a unique value in a System Access Type (SYSACCTYPE) parameter.

SSD is typically provided by ANS-41 system 14 to the system currently serving its subscriber (i.e., GSM system 12) to authenticate the subscriber. The SSD provided by the home ANS-41 system is used to produce authentication vectors usable by the VLR of GSM system 12 to authenticate the subscriber.

Figure 2:
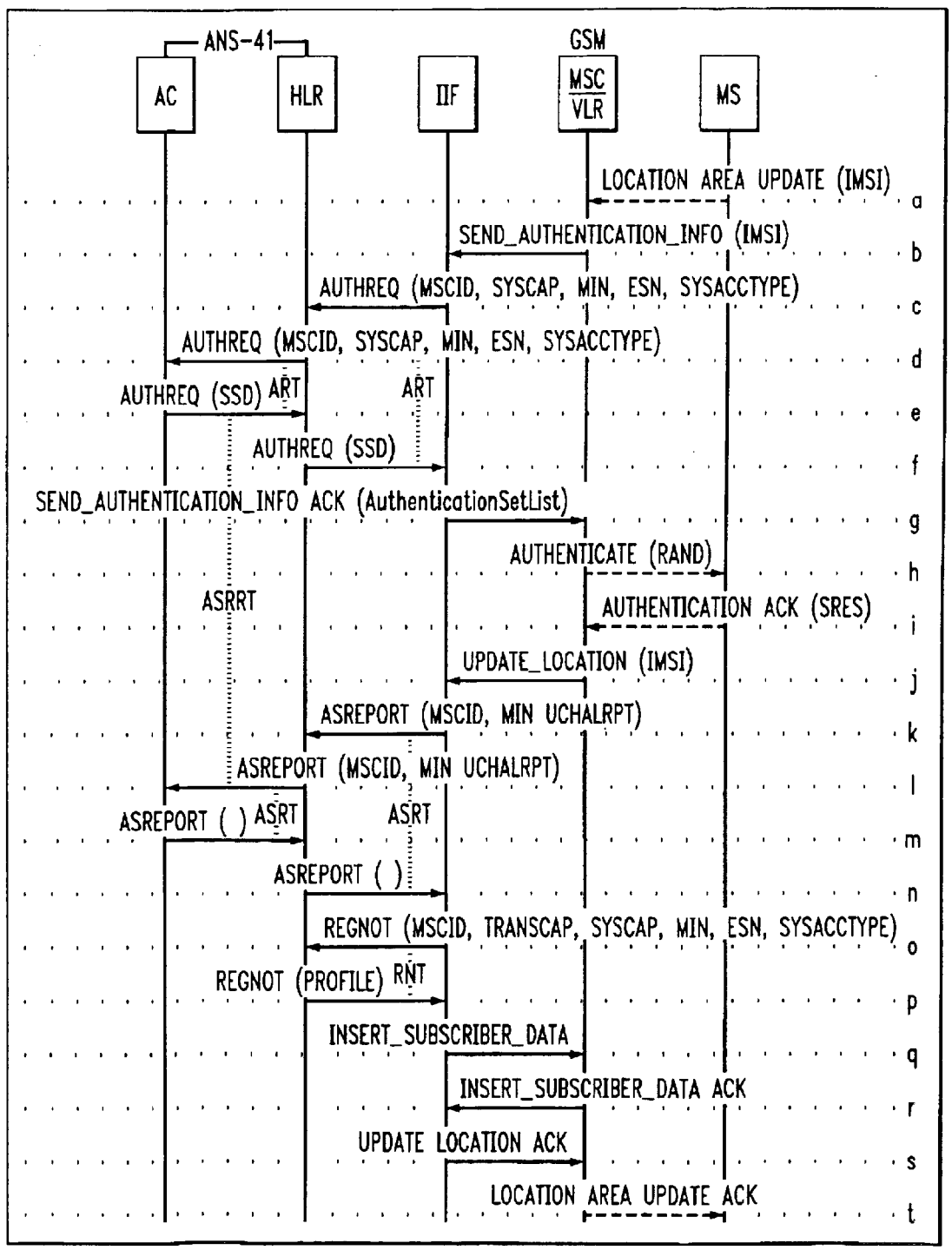
FIG. 2 depicts an example of a successful authentication of a subscriber of ANS-41 system in GSM system in an initial access attempt.

FIG. 2 depicts an example 20 of a successful authentication of a subscriber of ANS-41 system 14 in GSM system 12 in an initial access attempt, wherein user equipment 16 associated with the subscriber uses a MIN-based IMSI as its identifier in GSM system 12. In step a, the mobile-station (MS) or user equipment determines that a new serving system, i.e., GSM system 12 has been entered. MS registers at GSM system 12 and requests for system access by providing its MIN-based IMSI to GSM system 12 in a location area update message.

In step b, GSM system 12 sends a SEND_AUTHENTICATION_INFO to IIF 10, wherein the SEND_AUTHENTICATION_INFO is an authentication information message having the IMSI. In step c, IIF 10 sends an AUTHREQ to the HLR of the subscriber's home system, i.e., ANS-41 system 14. The AUTHREQ includes a MSCID, SYSCAP, MIN, ESN, and SYSACCTYPE, wherein MSCID identifies IIF 10, SYSCAP indicates that the subscriber is roaming in GSM system 12, ESN is a default value and SYSACCTYPE indicates GSM system access. The MIN is set to a value derived from the MIN-based IMSI.

In step d, the HLR forwards the AUTHREQ to an authentication center (AC), which may be a part of ANS-41 system 12 or a separate entity. In step e, the AC determines that the subscriber is roaming in GSM system 12 based on the SYSCAP and responds with an authreq to the HLR, wherein the authreq includes the SSD associated with the subscriber. Note that the ESN, SYSCAP or SYSACCTYPE in the AUTHREQ may alone, or in combination, indicate to the HLR or AC that the associated subscriber (as indicated by the MIN) is attempting to gain access in a system that uses a different authentication process than the AC of the present system. In step f, the HLR forwards the authreq to IIF 10. Note that the SYSACCTYPE would indicate to the AC that the ESN generated by IIF 10 (i.e., default value) is not the real ESN of the subscriber, whereas the SYSCAP indicates that a serving MSC is using GSM authentication and privacy procedures. When the AC sees these indications, AC knows its okay to provide the SSD of the subscriber.

In step g, IIF 10 determines one or more groups of GSM triplets using the subscriber's SSD and the CAVE algorithm. IIF 10 sends a SEND_AUTHENTICATION_INFO acknowledgement (or ack) to GSM system 12, wherein the SEND_AUTHENTICATION_INFO ack includes an AuthenticationSetList having the one or more groups of GSM triplets.

In step h, GSM system 12 issues a RAND or Unique Challenge to the MS. In step i, the MS responds to the RAND with its response or RES. In step j, GSM system 12 compares the RES received from the MS with the expected response or XRES in one of the GSM triplets. In this example, the RES is identical to the XRES. Accordingly, GSM system 12 sends an UPDATE_LOCATION to IIF 10, wherein the UPDATE_LOCATION includes the IMSI.

Note that, in one embodiment, TR-45 AHAG is used to determine a manner of computing the XRES in response to the RAND in GSM system 12 by IIF 10 and the MS. The TR-45 AHAG may also be used to determine how the cipher key $K_c$ is computed.

In step k, IIF sends an authentication status report (ASREPORT) to the HLR of ANS-41 system 14, wherein the ASREPORT includes the MSCID, MIN and a UCHAL-RPT for indicating that the RAND (or Unique Challenge) was successful. In step 1, the HLR forwards the ASREPORT to the AC. In step m, the AC responds with an asreport to the HLR. In step n, the HLR forwards the asreport to IIF 10. In step o, IIF 10 sends a registration notice (REGNOT) to the HLR, wherein the REGNOT includes the MSCID, SYSCAP, MIN, ESN, SYSACCTYPE and a TRANSCAP. The SYSCAP indicates that the subscriber is roaming in GSM system 12 and the SYSACCTYPE indicates GSM system access.

In step p, the HLR sends a regnot to IIF 10, which includes a profile of the subscriber. In step q, IIF 10 sends an INSERT_SUBSCRIBER_DATA to GSM system 12. In step r, GSM system 12 responds with an INSERT_SUBSCRIBER_DATA ack to IIF 10. In step s, IIF 10 sends an UPDATE_LOCATION ack to GSM system 12. In step t, GSM system 12 sends a location area update ack to the MS.

Figure 3:
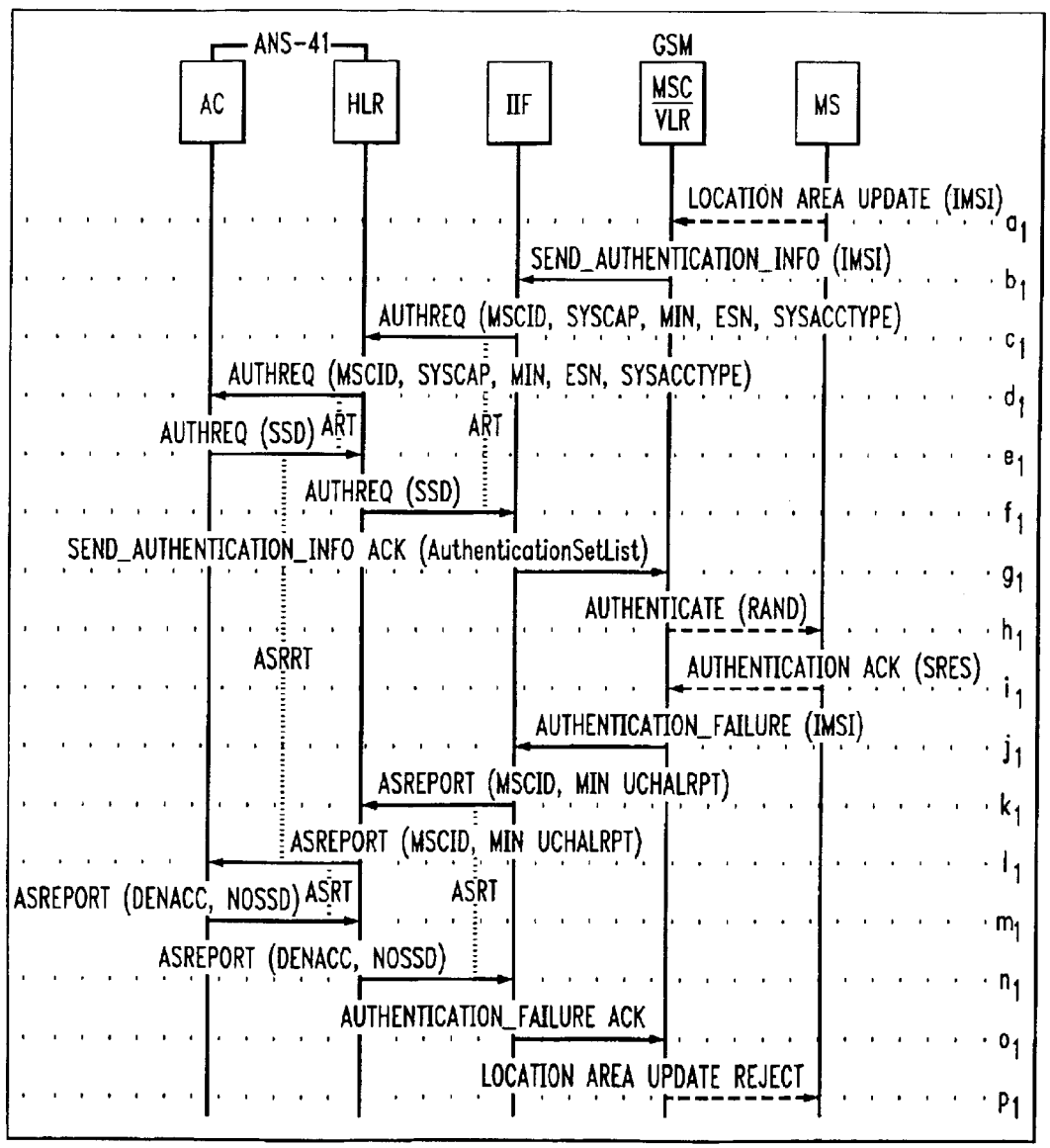
FIG. 3 depicts an example of an unsuccessful authentication of a subscriber of ANS-41 system in GSM system in an initial access attempt.

FIG. 3 depicts an example 30 of an unsuccessful authentication of a subscriber of ANS-41 system 14 in GSM system 12 in an initial access attempt, wherein user equipment 16 associated with the subscriber uses a MIN-based IMSI as its identity in GSM system 12. Steps $a_1$–$i_1$ of FIG. 3 corresponding to steps a–i of FIG. 2. In step $j_1$, GSM system 12 compares the RES received from the MS with the XRES in one of the GSM triplets. In this example, the RES is not identical to the XRES. Thus, authentication fails and GSM system 12 sends an Authentication_Failure to IIF 10, wherein the Authentication_Failure indicates the IMSI.

In step $k_1$, IIF 10 sends an ASREPORT to the HLR of ANS-41 system 14. The MIN being derived from the IMSI and the UCHALRPT indicating the RAND (or Unique Challenge) was a failure. In step $1_1$, the HLR forwards the ASREPORT to the AC. In step $m_1$, the AC sends an asreport to the HLR, wherein the asreport includes DENACC and NOSSD parameters. In step $n_1$, the HLR forwards the asreport to IIF 10. In step $o_1$, IIF removes the SSD received for the MS from the AC and any other information for the MS from its memory. IIF 10 sends an Authentication_Failure ack to GSM system 12. In step $p_1$, GSM system 12 rejects the MS' request for system access.

Figure 4:
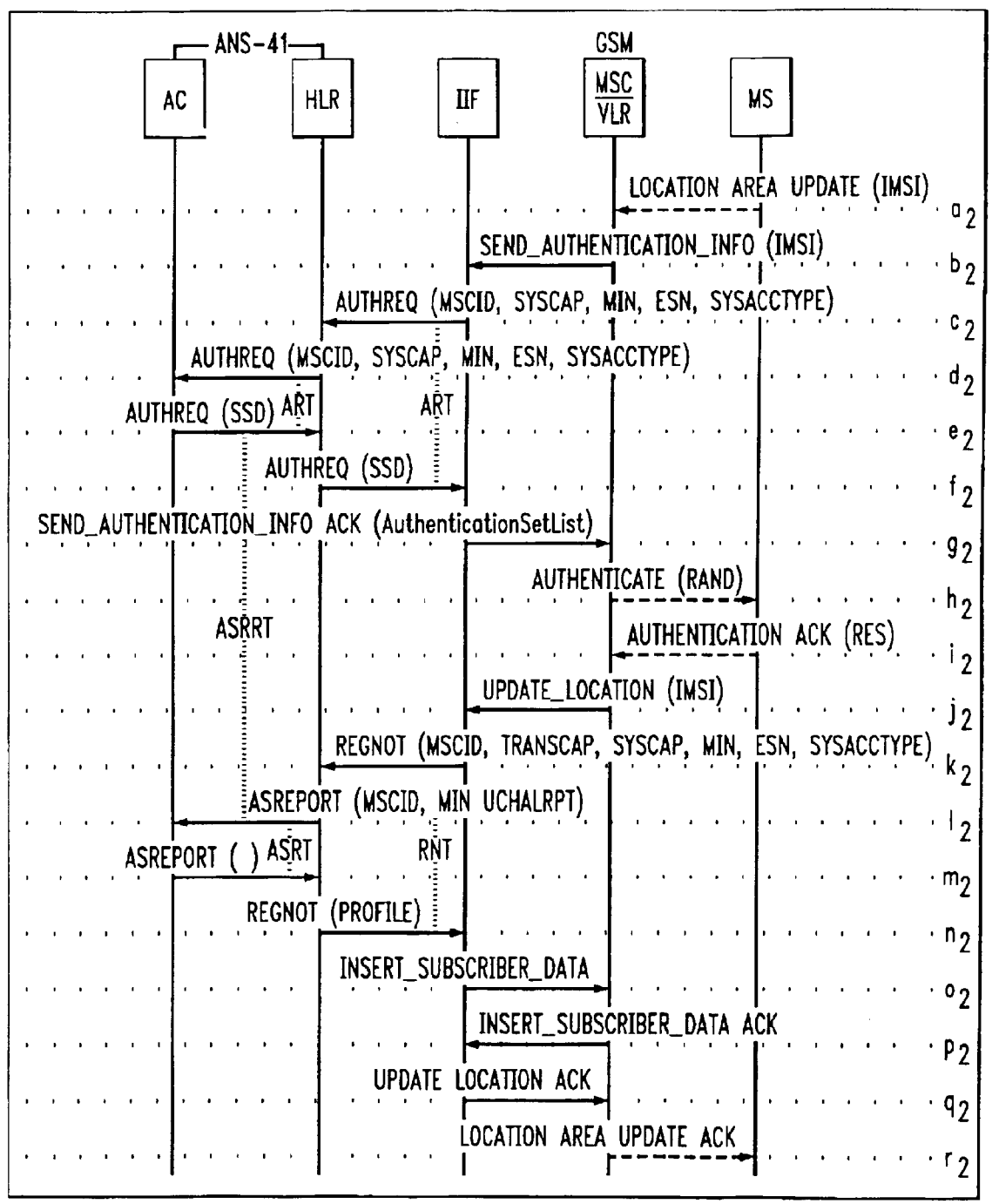
FIG. 4 depicts an example of a successful authentication of a subscriber of ANS-41 system in GSM system in an initial access attempt in which a Registration Notification INVOKE with a SYSACCTYPE parameter value indicating GSM access with successful authentication is used.

FIG. 4 depicts an example 40 of a successful authentication of a subscriber of ANS-41 system 14 in GSM system 12 in an initial access attempt, wherein user equipment 16 associated with the subscriber uses a MIN-based IMSI as its identity in GSM system 12. In this example, IIF 10 would not send an ASREPORT to indicate a successful Unique Challenge. Rather, IIF 10 sends a Registration Notification INVOKE with a SYSACCTYPE parameter value indicating GSM access with successful authentication.

Steps $a_2$–$j_2$ of FIG. 4 being identical to steps a–j of FIG. 2. In step $k_2$, IIF 10 sends a REGNOT to the HLR. SYSACCTYPE is set to indicate GSM access with successful authentication, and SYSCAP is set to indicate GSM system 12. In step $1_2$, the HLR determines the subscriber is authorized for service in GSM system 12. The HLR sends an ASREPORT to the AC, wherein the ASREPORT includes an UCHALRPT indicating that the RAND or unique challenge was successful and a MSCID set to indicate IIF 10.

In step $m_2$, the AC sends an asreport to the HLR. In step $n_2$, the HLR sends a regnot to IIF 10. In step $o_2$, IIF 10 sends an INSERT_SUBSCRIBER_DATA to GSM system 12. In step $p_2$, GSM system 12 sends an INSERT_SUBSCRIBER_DATA ack to IIF 10. In step $q_2$, IIF 10 sends an UPDATE_LOCATION ack to GSM system 12. In step $r_2$, GSM system 12 sends a location area update ack to the MS.

Although the present invention has been described in considerable detail with reference to certain embodiments, other versions are possible. Therefore, the spirit and scope of the present invention should not be limited to the description of the embodiments contained herein.

We claim:

1. A method of providing authentication in a wireless communication system comprising the steps of:

transmitting a first message to a first system from an Interoperability/Interworking Function (IIF), the first message comprising a mobile identifier for a subscriber of the first and a second system indicator indicating that the subscriber is attempting to gain access to a second system that uses an authentication process different than an authentication process used by the first system, the IIF being a separate entity from the first and second systems;

receiving a second message from the first system at the IIF having shared secret data associated with the subscriber;

generating an expected response at the IIF to a unique challenge using the shared secret data and an encryption algorithm; and transmitting the expected response to the second system from the IIF.

2. The method of claim 1, wherein the second system indicator includes at least one of the following: an electronic serial number set to a default or null value; a system capability parameter indicating that the subscriber is roaming in a GSM based wireless communication system; or a system access type parameter indicating that the subscriber is attempting to gain access in a GSM based wireless communication system.

3. An logical network entity comprising: means for transmitting a first message to a first system, the first message comprising a mobile identifier for a subscriber of the first system and a second system indicator indicating that the subscriber is attempting to gain access to a second system that uses an authentication process different than an authentication process used by the first system, the first system being different from the second system;

means for receiving a second message from the first system having shared secret data associated with the subscriber;

means for generating an expected response to a unique challenge using the shared secret data and an encryption algorithm; and means for transmitting the expected response to the second system.

4. The logical network entity of claim 3, wherein the second system indicator includes at least one of the following: an electronic serial number set to a default or null value; a system capability parameter indicating that the subscriber is roaming in a GSM based wireless communication system; or a system access type parameter indicating that the subscriber is attempting to gain access in a GSM based wireless communication system.

5. A method of providing authentication in a wireless communication system comprising the steps of:

receiving a first message at a first system from an Interoperability/Interworking Function (IIF), the first message comprising a mobile identifier for a subscriber of the first and a second system indicator indicating that the subscriber is attempting to gain access to a second system that uses an authentication process different than an authentication process used by the first system, the IIF being a separate entity from the first and second systems;

determining shared secret data associated with the subscriber using the mobile identifier and the second system indicator; and transmitting a second message from the first system having the shared secret data to the IIF for calculation by the IIF of an expected response.

6. The method of claim 5, wherein the second system indicator includes at least one of the following: an electronic serial number set to a default or null value; a system capability parameter indicating that the subscriber is roaming in a GSM based wireless communication system; or a system access type parameter indicating that the subscriber is attempting to gain access in a GSM based wireless communication system.

* * * * *